Jan. 20, 1959  R. A. MIESEL  2,869,641
APPARATUS FOR PUNCHING CARDS
Filed Oct. 22, 1956
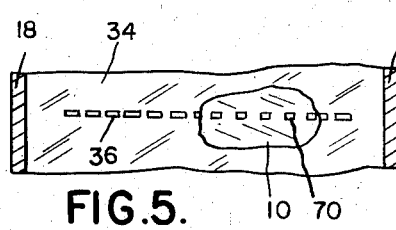
FIG.5.
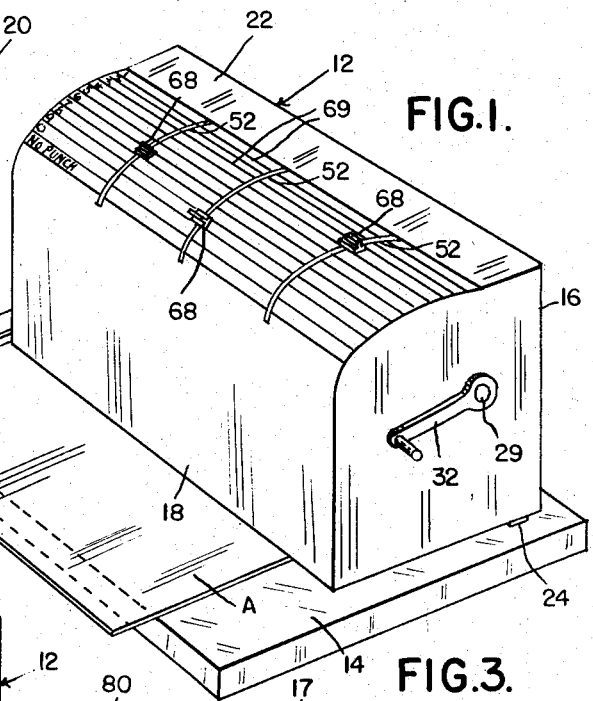
FIG.1.
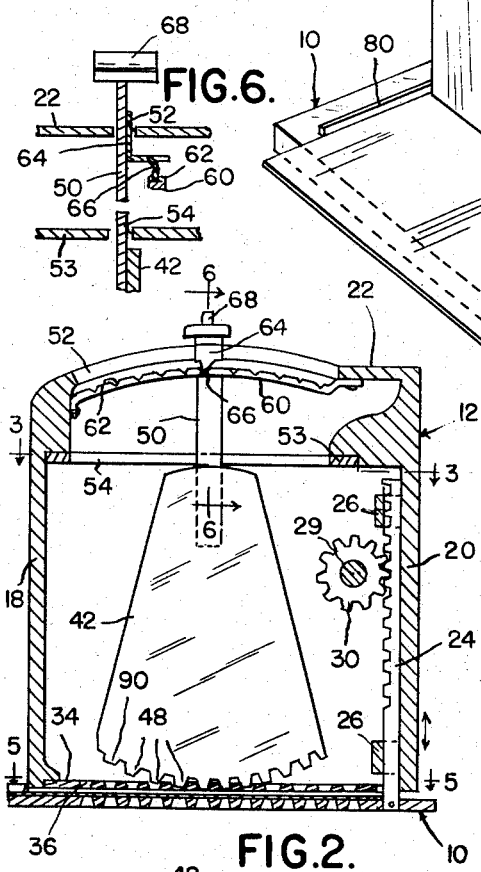
FIG.6.
FIG.2.
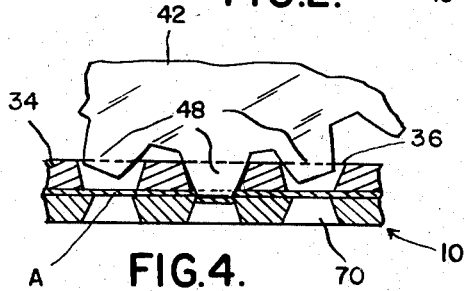
FIG.4.
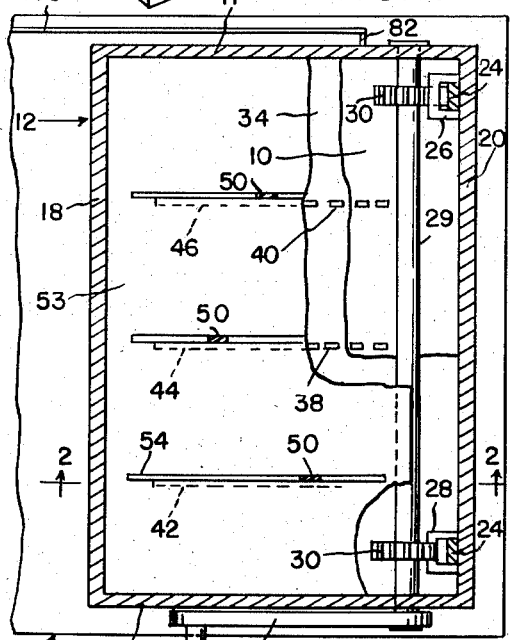
FIG.3.
INVENTOR.
ROSS A. MIESEL
BY
Whittemore, Hulbert & Belknap
ATTORNEYS United States Patent Office 2,869,641
Patented Jan. 20, 1959

2,869,641

APPARATUS FOR PUNCHING CARDS

Ross A. Miesel, Detroit, Mich.

Application October 22, 1956, Serial No. 617,367

7 Claims. (Cl. 164—111)

This invention relates to apparatus for punching cards to record information thereon.

The present day apparatus for punching cards such as the standard I. B. M. cards to record data or information thereon is usually large, bulky and extremely expensive so that the use of such equipment by small organizations with limited funds and a limited need for such apparatus is prohibitive.

One object of the invention is to provide apparatus for punching cards which is portable and composed of a relatively few simple parts and hence is relatively inexpensive.

Other objects of the invention will become apparent as the following description proceeds, especially when considered with the accompanying drawing, wherein:

Fig. 1 is a perspective view of apparatus embodying the present invention.

Fig. 2 is a vertical sectional view of the apparatus shown in Fig. 1, taken along the line 2—2 on Fig. 3.

Fig. 3 is a sectional view along the line 3—3 on Fig. 2, with parts broken away.

Fig. 4 is an enlarged fragmentary view of a portion of the structure shown in Fig. 2.

Fig. 5 is a fragmentary view, taken along the line 5—5 on Fig. 2.

Fig. 6 is a sectional view, taken along the line 6—6 on Fig. 2.

Referring now more particularly to the drawing, the apparatus comprises a base 10 and a casing 12 supported above the base for vertical movement toward and away from the base.

In use, the base will normally be supported on a flat horizontal surface so that the top surface 14 of the base will also extend in a horizontal plane. The casing 12 includes side walls 16 and 17, a front wall 18 and a rear wall 20. The top of the casing is closed by a top wall 22 which is curved somewhat as illustrated. Extending vertically upwardly from the base 10 are a pair of rack bars 24 which are spaced apart laterally and located near opposite sides of the casing at the rear thereof. The rack bars project upwardly in the casing along the inner side of the rear wall 20. One of the bars 24 is slidable in the vertically spaced U-shaped mounting brackets 26 on the inner side of the rear wall, and the other rack bar is slidable in the vertically spaced U-shaped brackets 28 likewise secured to the inner side of the rear wall at the opposite side of the casing. The casing is thus capable of sliding vertically on the rack bars toward and away from the base.

In order to raise and lower the casing, a shaft 29 is provided within the casing extending from one side of the casing to the other, the opposite ends of the shaft being journaled in the opposite side walls 16 and 17. A pair of pinions 30 are rigidly secured to the shaft 29 at laterally spaced points in positions to mesh with the teeth of the respective rack bars 24. One end of the shaft 29 projects beyond the adjacent side wall of the casing and a crank 32 is secured to the projecting end of the shaft by means of which the shaft may be manually rotated to move the housing up and down relative to the base.

A plate 34 closes the bottom of the casing and is formed with three parallel rows or series of aligned equally spaced apertures, the rows being identified by the numerals 36, 38 and 40.

A punch member is associated with each of the rows 36, 38 and 40 of apertures, the punch members being designated by the reference numerals 42, 44 and 46. The punch members are of identical construction and therefore only the member 42 will be described. Referring to Fig. 2, the punch member 42 will be seen to be in the form of a vertically disposed flat plate having an arcuate lower periphery with a plurality of teeth or projections 48 arranged at equally spaced intervals along the arcuate periphery and extending outwardly therefrom, that is in a downward direction. The spacing between the projections is the same as the spacing between the apertures in row 36. The plate has secured thereto an operating handle or extension 50 which projects in an upward direction from the plate and through a slot 52 in the top wall of the casing, slot 52 extending in a front to rear direction. The casing also has an intermediate horizontal plate 53 secured thereto which is formed with a slot 54 which extends in a forward and rearward direction directly beneath slot 52. The handle 50 of the punch member is closely laterally confined by both slots to enable the punch member to rock in a vertical plane in a forward and rearward direction along a closely confined path.

Referring to Figs. 2 and 4, it will be seen that the lower end of the punch member 42 is supported directly upon the bottom plate 34 of the casing with one or more of the projections 48 projecting into the registering apertures in the row 36. As the punch member is rocked back and forth, the projections extend into successive apertures in the row 36.

Referring to Figs. 2 and 6, means are provided for releasably holding the punch member in a number of different positions of adjustment. Specifically, an elongated strip of flexible resilient material, indicated at 60, is provided having its opposite ends secured to the top wall 22 of the housing. The strip 60 extends along the slot 52 at one side thereof with the major intermediate portion thereof spaced beneath the top wall of the casing. The top surface of the strip is provided with a plurality of V-shaped notches 62. An L-shaped member 64 is secured to one side of the handle 50 having the vertically extending part secured directly to the handle and the horizontally extending part projecting between the top wall of the casing and the notched strip 60. The free edge of the horizontally extending part is formed with a downwardly turned detent portion 66, the lower end of which is V-shaped and bears against the top surface of strip 60. The L-shaped member 64 is formed of a suitable resilient material so that the detent portion 66 has a resilient bearing engagement with the strip 60. As the punch member is rocked back and forth, the detent 66 snaps into engagement with the notches to releasably hold the punch member in any desired position of adjustment. A slight manual pressure upon the finger grip 68 at the top of the handle 50 is sufficient to move the punch member from one position of adjustment to another.

As seen in Fig. 1, the top surface of the top wall 22 of the casing is formed with a plurality of laterally spaced parallel lines 69. In the present instance, eleven lines numbered 1, 2, 3, 4, 5, 6, 7, 8, 9, 0 and "No Punch" are provided. It will be noted that eleven notches 62 are also provided and the notches are so spaced that the eleven positions of adjustment of the punch member correspond exactly with the parallel lines on the top of the casing. That is, in any position of adjustment of the punch member determined by the engagement of the detent in a notch, the finger grip 68 of the handle overlies one of the parallel lines on the top of the casing.

In any given position of adjustment of the punch member, one only of the projections 48 extends completely through the registering aperture in the plate 34 and somewhat beneath the aperture, the adjacent projections extending only part way into the registering apertures.

Referring to Figs. 2, 4 and 5, it will be seen that the base plate 14 is formed with a row of apertures 70, the apertures of this row being located directly beneath the respective apertures in the bottom plate 34.

The apertures of the rows 38 and 40 are also equally spaced, the spacing between these apertures being the same as between the apertures in row 36. The base plate is also formed with rows 72 and 74 of apertures, the apertures in these rows being located directly beneath the apertures in rows 38 and 40. The punch members 44 and 46 are carried by the casing in the same manner as the member 42 and the projections on the lower peripheries of the punch members 44 and 46 move into the apertures of the rows 38 and 40 in the same manner. Likewise the punch members 44 and 46 have handles 50 guided by slots in the top wall of the casing and plate 54, and are provided with identical means for holding them in selected positions of adjustment.

The operation of the device should be readily apparent from the foregoing. In order to punch a card such as indicated at A, the three punch members are positioned as desired with the gripping member 68 overlying the desired indicia on the top surface of the casing. Then with the casing in its upper or retracted position illustrated in Fig. 2, the card is inserted upon the top surface of the base beneath the casing. An alignment bar 80 is provided along one side of the base having a right angle stop 82 at the rear end so that the card may be properly positioned on the base with one side edge in full surface-to-surface contact with the alignment bar 80 and with its rear edge abutting the stop 80. The casing is then moved downwardly by means of the crank arm 32 and one projection on each punch member, corresponding to the adjusted position of the punch member, will project completely through the corresponding aperture in the base plate 34 and beneath the latter aperture and into the registering aperture in the base 10, thereby punching out the portion of the card between these apertures. The card may be removed following raising of the casing with the desired information punched therein.

As seen in Fig. 2, the forwardmost one of the projections 48 on punch member 42 is shortened as indicated at 90. The shortened projection 90 corresponds with the "No Punch" position of the punch member 42 and will project into the corresponding aperture in the base plate 34 when the punch member is in the "No Punch" position. However, the shortened projection 90 will not extend completely through the corresponding aperture in the base plate and therefore will not punch out a portion of the card between the base plate 34 and the base 10. The other punch members are similarly constructed.

What I claim as my invention is:

1. Apparatus for punching cards comprising a base having a series of aligned spaced recesses therein, a support mounted for movement toward and away from said base, and a punch member carried by said support, said punch member having an arcuate series of spaced projections respectively registrable with said recesses, said punch member being rockable relative to said support to different positions of adjustment, a different projection extending into the corresponding recess in each position of adjustment of said punch member upon movement of said support toward said base to punch a hole in a card supported on said base in overlying relation to said recesses.

2. Apparatus for punching cards comprising a base having a series of aligned spaced recesses therein, a support mounted for movement toward and away from said base, said support having a plate formed with an aligned series of spaced apertures, said plate being located to overlie said base with the apertures therein respectively registering with said recesses upon movement of said support toward said base, a punch member having an arcuate periphery and a series of spaced projections along said arcuate periphery respectively registrable with said apertures, means supporting said punch member on said support in overlying relation to said plate for rocking movement in opposite directions to different positions of adjustment, said projections successively extending through the apertures of said series in succession as said punch member is rocked in opposite directions, a different projection extending through the corresponding aperture in each position of adjustment of said punch member and also extending into the registering recess upon movement of said support toward said base to punch a hole in a card supported on said base in overlying relation to said recesses.

3. Apparatus as defined in claim 2 including means for releasably holding said punch member in each position of adjustment thereof.

4. Apparatus as defined in claim 3 including indicia on said support associated with said punch member indicating each position of adjustment.

5. Apparatus for punching cards comprising a base having a plurality of laterally spaced parallel rows of aligned spaced recesses in the top surface, a casing above said base mounted on said base for vertical movement toward and away from said base, said casing having a bottom plate formed with a plurality of laterally spaced parallel rows of aligned spaced apertures, said plate being located to overlie said base with the apertures in each row of apertures registering with the respective recesses in a row of recesses upon movement of said casing toward said base, a punch member associated with each row of apertures, each punch member having an arcuate periphery and a series of spaced projections along said arcuate periphery respectively registrable with the apertures in the associated row of apertures, means supporting each punch member within said casing in overlying relation to said plate for rocking movement in opposite directions to different positions of adjustment, said projections of each punch member successively extending through the apertures of the associated row of apertures in succession as said punch member is rocked in opposite directions, a different projection of each punch member extending through the corresponding aperture in each position of adjustment of said punch member and also extending into the registering recess upon movement of said casing toward said base to punch a hole in a card supported on said base in overlying relation to said recesses.

6. Apparatus as defined in claim 5 including means for releasably holding said punch member in each position of adjustment thereof.

7. Apparatus as defined in claim 6 in which said casing has a top wall provided with elongated slots respectively associated with said punch members, each punch member having a part projecting through the associated slot and terminating exteriorly of said casing for manual adjustment of said punch member, and indicia on said top wall along said slots to indicate the position of adjustment of said punch members.

References Cited in the file of this patent

UNITED STATES PATENTS

| | | |
|---|---|---|
| 1,061,883 | Tily et al. | May 13, 1913 |
| 1,430,014 | Hyman | Sept. 26, 1922 |